(12) United States Patent
Adachi et al.

(10) Patent No.: US 11,867,628 B2
(45) Date of Patent: Jan. 9, 2024

(54) SAMPLE MEASUREMENT DEVICE AND SAMPLE MEASUREMENT METHOD

(71) Applicant: Hitachi, Ltd., Tokyo (JP)

(72) Inventors: Sakuichiro Adachi, Tokyo (JP); Takahiro Ando, Tokyo (JP)

(73) Assignee: HITACHI, LTD., Tokyo (JP)

(*) Notice: Subject to any disclaimer, the term of this patent is extended or adjusted under 35 U.S.C. 154(b) by 129 days.

(21) Appl. No.: 17/615,079

(22) PCT Filed: Apr. 17, 2020

(86) PCT No.: PCT/JP2020/016945
§ 371 (c)(1),
(2) Date: Nov. 29, 2021

(87) PCT Pub. No.: WO2021/009987
PCT Pub. Date: Jan. 21, 2021

(65) Prior Publication Data
US 2022/0228981 A1    Jul. 21, 2022

(30) Foreign Application Priority Data
Jul. 16, 2019    (JP) .................................. 2019-131217

(51) Int. Cl.
*G01N 21/51* (2006.01)
*G01N 21/49* (2006.01)

(52) U.S. Cl.
CPC ....... *G01N 21/51* (2013.01); *G01N 2021/495* (2013.01)

(58) Field of Classification Search
CPC ........... G01N 21/6428; G01N 15/1459; G01N 2015/1006; G01N 2021/6439;
(Continued)

(56) References Cited

U.S. PATENT DOCUMENTS

| | | | | |
|---|---|---|---|---|
| 2003/0123057 A1* | 7/2003 | Lemmo | ...................... | G01J 3/28 356/301 |
| 2011/0304850 A1* | 12/2011 | Sakamoto | .............. | G01N 21/53 356/337 |
| 2019/0242816 A1* | 8/2019 | Conner | .................. | G01N 27/06 |

FOREIGN PATENT DOCUMENTS

| | | | | |
|---|---|---|---|---|
| DE | 102011003140 A1 * | 7/2012 | ............. | G01N 13/00 |
| EP | 1109014 A2 * | 6/2001 | ....... | G01N 27/44721 |

(Continued)

OTHER PUBLICATIONS

Office Action issued in Japanese Application No. 2019-131217, dated Oct. 4, 2022, in 4 pages.

*Primary Examiner* — Michael P Stafira
(74) *Attorney, Agent, or Firm* — Procopio, Cory, Hargreaves & Savitch, LLP

(57) ABSTRACT

A sample measurement device includes: a sample container that stores a sample solution; a light source that irradiates the sample container with irradiation light from a first direction; an imaging part that captures an image of the sample solution based on light scattered by the sample solution from a second direction intersecting the first direction; and a calculator that calculates an absorbance or a concentration of the sample solution based on the image. The calculator calculates a degree of attenuation of a light amount of the image at a constant optical path length along the first direction based on the image, and calculates the absorbance or concentration of the sample solution according to the degree of attenuation.

12 Claims, 5 Drawing Sheets

(58) Field of Classification Search
CPC ........... G01N 2015/149; G01N 15/147; G01N 15/1468; G01N 15/1404; G01N 33/5005; G01N 2015/0065; G01N 2015/1415; G01N 33/48; G01N 2015/1406; G01N 21/63; G01N 33/582; G01N 21/51; G01N 21/6458; G01N 21/6452; G01N 33/6869; G01N 2015/0038; G01N 2201/06113; G01N 15/14; G01N 21/6486; G01N 33/74; G01N 15/1463; G01N 35/10; G01N 2201/062; G01N 2800/32; G01N 33/53; G01N 21/65; G01N 33/6887; G01N 2333/545; G01N 15/1434; G01N 21/645; G01N 21/59; G01N 15/1429; G01N 33/54326; G01N 21/0303; G01N 21/00; G01N 2800/324; G01N 21/64; G01N 33/5308; G01N 33/92; G01N 2015/1486; G01N 33/54393; G01N 33/577; G01N 2015/1452; G01N 2201/02; G01N 33/56983; G01N 1/4077; G01N 2035/00495; G01N 2333/525; G01N 33/56972; G01N 2001/4083; G01N 2015/1447; G01N 2015/1493; G01N 2035/1018; G01N 2333/575; G01N 2333/62; G01N 2333/91188; G01N 2333/96463; G01N 33/573; G01N 33/743; G01N 33/80; G01N 33/82; G01N 2015/1402; G01N 2800/52; G01N 15/1456; G01N 2201/0697; G01N 35/0098; G01N 15/06; G01N 2015/0693; G01N 2201/1247; G01N 2201/12761; G01N 21/05; G01N 21/253; G01N 33/54333; G01N 33/56911; G01N 35/0099; G01N 2800/00; G01N 33/6863; G01N 33/6893; G01N 2201/0627; G01N 33/585; G01N 33/543; G01N 33/68; G01N 2021/6421; G01N 33/6872; G01N 2333/47; G01N 2333/54; G01N 2800/325; G01N 33/54373; G01N 15/1425; G01N 15/1475; G01N 21/3577; G01N 2333/4712; G01N 33/54313; G01N 33/56966; G01N 33/6896; G01N 2015/1497; G01N 21/03; G01N 2291/02836; G01N 2291/02872; G01N 33/483; G01N 15/0227; G01N 21/3563; G01N 21/6456; G01N 35/00029; G01N 15/0211; G01N 2021/6419; G01N 2035/00554; G01N 2035/103; G01N 21/658; G01N 2291/02881; G01N 2333/4709; G01N 1/38; G01N 2021/0346; G01N 2035/0401; G01N 21/55; G01N 35/02; G01N 35/04; G01N 35/08; G01N 15/0205; G01N 2021/6441; G01N 2035/00356; G01N 21/21; G01N 21/27; G01N 21/31; G01N 2201/0221; G01N 35/00871; G01N 2021/1793; G01N 2021/6471; G01N 2035/00039; G01N 2035/00306; G01N 2035/1032; G01N 21/255; G01N 2201/065; G01N 2201/08; G01N 2800/50; G01N 33/58; G01N 33/72; G01N 2021/0325; G01N 2021/6417; G01N 21/0332; G01N 21/3581; G01N 21/47; G01N 21/648; G01N 21/78; G01N 2333/32; G01N 33/533; G01N 35/028; G01N 2021/6484; G01N 21/17; G01N 21/359; G01N 2201/0631; G01N 2201/0636; G01N 2201/0675; G01N 2333/515; G01N 2800/24; G01N 2800/2821; G01N 2800/7028; G01N 33/6854; G01N 33/6857; G01N 2015/0053; G01N 2015/1075; G01N 2021/6482; G01N 2035/0425; G01N 21/35; G01N 21/4738; G01N 21/6408; G01N 21/9508; G01N 2201/0212; G01N 2333/5412; G01N 2333/58; G01N 2333/705; G01N 27/44721; G01N 2800/60; G01N 33/18; G01N 33/487; G01N 33/54366; G01N 33/574; G01N 2015/0238; G01N 2021/4726; G01N 2035/041; G01N 2035/042; G01N 21/01; G01N 21/636; G01N 21/71; G01N 21/76; G01N 2201/0612; G01N 27/44726; G01N 33/4925; G01N 33/54306; G01N 33/587; G01N 15/1436; G01N 2021/651; G01N 2201/10; G01N 2201/103; G01N 2201/12; G01N 2201/129; G01N 2333/475; G01N 2496/15; G01N 33/96; G01N 35/00; G01N 35/1011; G01N 35/1065; G01N 1/30; G01N 15/1484; G01N 2015/0222; G01N 2021/1765; G01N 2021/6478; G01N 2035/00326; G01N 21/49; G01N 21/6445; G01N 21/7703; G01N 2333/48; G01N 2333/5443; G01N 2333/7155; G01N 27/44752; G01N 27/44782; G01N 33/02; G01N 33/57496; G01N 33/88; G01N 35/0092; G01N 1/00; G01N 15/042; G01N 15/05; G01N 2001/007; G01N 2015/047; G01N 2015/1472; G01N 2015/1477; G01N 2021/152; G01N 2021/7786; G01N 2035/1062; G01N 21/278; G01N 2201/06153; G01N 2201/0638; G01N 2201/105; G01N 33/28; G01N 33/2823; G01N 33/5002; G01N 33/57484; G01N 1/28; G01N 1/34; G01N 15/1427; G01N 2015/144; G01N 2021/0367; G01N 2021/495; G01N 2021/6463; G01N 2021/655; G01N 2035/0436; G01N 2201/0626; G01N 27/447; G01N 33/54346; G01N 33/551; G01N 35/1002; G01N 2015/1254; G01N 2015/1438; G01N 2015/1445; G01N 2015/1488; G01N 2021/0339; G01N 2021/4707; G01N 2021/475; G01N 2021/4759; G01N 2021/4764; G01N 2021/513; G01N 2035/00881; G01N 2035/0412; G01N 2035/1076; G01N 21/274; G01N 21/474; G01N 21/553; G01N 21/554; G01N 21/6454; G01N 21/80; G01N 21/85; G01N 21/8507; G01N 33/48707; G01N 33/5302; G01N 33/588; G01N 33/6803; G01N 35/00732; G01N 1/31; G01N 1/44; G01N 15/00; G01N 2013/003; G01N 2015/0294; G01N 2015/1087; G01N 2015/145; G01N 2021/0112; G01N 2021/0378; G01N 2021/1734; G01N 2021/4709; G01N 2021/6473; G01N 2021/656; G01N 2035/1034; G01N 2035/1048; G01N 2035/1051; G01N 21/11; G01N 21/3586; G01N 21/41; G01N 21/4795; G01N 21/53; G01N 21/532; G01N 2201/104; G01N 2500/00; G01N 2500/02; G01N 2500/04; G01N 27/44743; G01N 27/44791; G01N 29/2418; G01N 33/4833; G01N 33/49; G01N 33/5011; G01N 33/5085; G01N 33/536; G01N 33/5438; G01N 33/54386; G01N 33/56916; G01N 33/57438; G01N 33/6842; G01N 33/6845; G01N 33/86; G01N 35/00722; G01N 35/1016; G01N 35/1083; G01N 35/1095; G01N 1/36; G01N 2001/4027; G01N 2011/008; G01N 2015/025; G01N 2015/1409; G01N 2015/1454; G01N 2015/1495; G01N 2021/0364; G01N 2021/3133; G01N 2021/4711; G01N 2021/6432; G01N 2021/8411; G01N 2021/8557; G01N 2030/027; G01N 2035/00158; G01N 2035/00237; G01N 2035/0493; G01N 2035/1025; G01N 21/031; G01N 21/1702; G01N 21/4785; G01N 21/7743; G01N 21/81; G01N 21/8851; G01N 21/9027; G01N 2201/061; G01N 2201/0635; G01N 2201/068; G01N 2201/0691; G01N 2201/0833; G01N 2333/195; G01N 2333/245; G01N 2333/31; G01N 2333/33; G01N 2333/52; G01N 2333/96455; G01N 2333/96494; G01N 2405/00; G01N 27/02; G01N 27/44717; G01N 27/4473; G01N 27/44756; G01N 2800/085; G01N 2800/54; G01N 29/0681; G01N 30/14; G01N 30/38; G01N 30/74; G01N 33/025; G01N 33/04; G01N 33/14; G01N 33/15; G01N 33/5008; G01N 33/5091; G01N 33/54353; G01N 33/56938; G01N 33/57415; G01N 33/57434; G01N 33/57492; G01N 35/00613; G01N 1/40; G01N 15/02; G01N 15/0266; G01N 15/10; G01N 15/1012; G01N 15/1056; G01N 2015/0046; G01N 2015/008; G01N 2015/0088; G01N 2015/0092; G01N 2015/0233; G01N 2015/0288; G01N 2015/0687; G01N 2015/1018; G01N 2015/1093; G01N 2015/1413; G01N 2021/0357; G01N 2021/1738; G01N 2021/391; G01N 2021/4735; G01N 2021/5957; G01N 2021/6491; G01N 2021/7759; G01N 2030/326; G01N 2030/8813; G01N 2035/00376; G01N 2035/00782; G01N 2035/0091; G01N 2035/0405; G01N 2035/0437; G01N 2035/0463; G01N 2035/1053; G01N 21/25; G01N 21/272; G01N 21/4788; G01N 21/552; G01N 21/6402; G01N 21/643; G01N 21/66; G01N 21/8483; G01N 21/94; G01N 2201/024; G01N 2201/0245; G01N 2201/0415; G01N 2201/0625; G01N 2201/0813; G01N 2333/11; G01N 2333/165; G01N 233/46; G01N 2333/46; G01N 2333/4704; G01N 2333/5403; G01N 2333/59; G01N 2333/70589; G01N 2333/70596; G01N 2333/7158; G01N 2333/90283; G01N 2333/91177; G01N 2333/9121; G01N 2520/00; G01N 27/44704; G01N 27/44734; G01N 27/745; G01N 2800/367; G01N 29/0672; G01N 30/20; G01N 30/6095; G01N 31/227; G01N 33/146; G01N 33/491; G01N 33/50; G01N 33/5026; G01N 33/5306; G01N 33/5375; G01N 33/542; G01N 33/569; G01N 35/00069; G01N 35/00584; G01N 35/00712; G01N 35/026; G01N 35/1004; G01N 35/1009; G01N 35/1074; G01N 35/109

See application file for complete search history.

(56) References Cited

FOREIGN PATENT DOCUMENTS

| | | | | |
|---|---|---|---|---|
| JP | 2004340804 | A | 12/2004 | |
| JP | 2006194775 | A | 7/2006 | |
| JP | 2006276000 | A * | 10/2006 | ......... G01N 21/6428 |
| JP | 4220879 | B2 | 2/2009 | |
| JP | 2012002563 | A * | 1/2012 | ............. G01N 21/53 |
| JP | 2014048233 | A * | 3/2014 | ............. G01N 21/61 |
| JP | 2015-102459 | A | 6/2015 | |
| JP | 2015102459 | A * | 6/2015 | |
| JP | 2016070671 | A * | 5/2016 | |
| WO | WO-02068932 | A2 * | 9/2002 | ........... C12Q 1/6816 |
| WO | WO-2019130668 | A1 * | 7/2019 | ........... G01N 21/274 |

* cited by examiner

FIG. 1
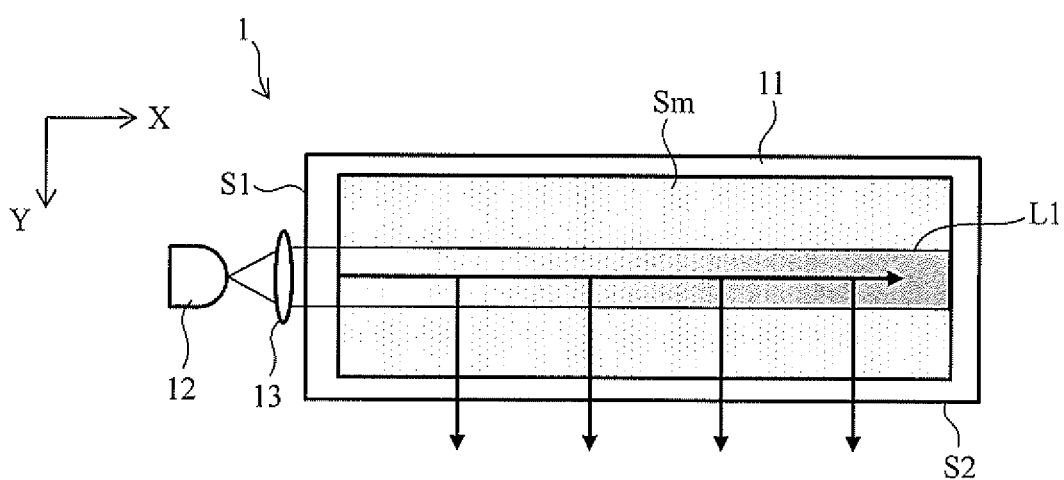
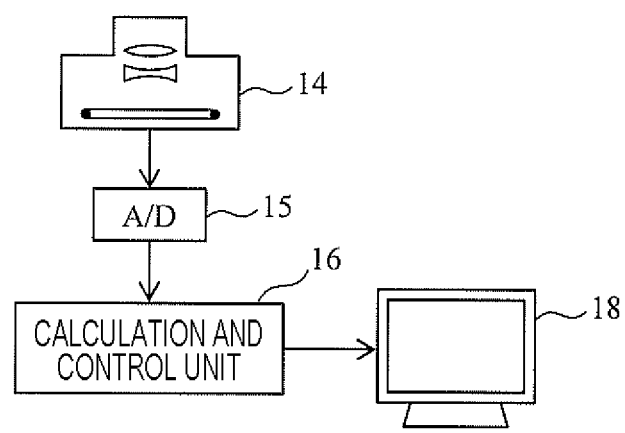

FIG. 3
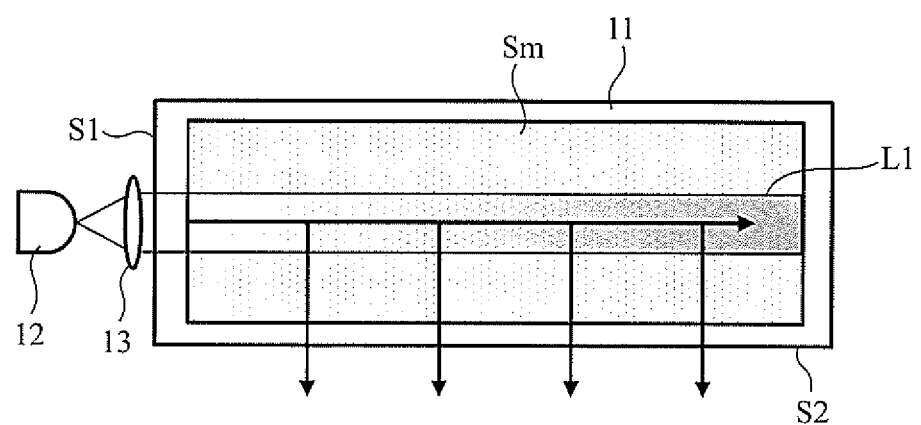
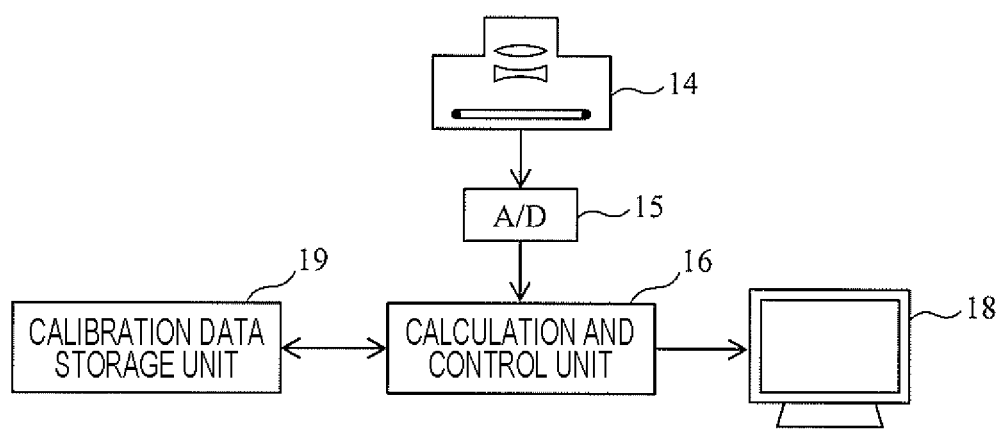

SAMPLE MEASUREMENT DEVICE AND SAMPLE MEASUREMENT METHOD

TECHNICAL FIELD

The present invention relates to a sample measurement device and a sample measurement method for measuring an absorbance or a concentration of a sample.

BACKGROUND ART

One of methods for measuring the concentration of a component in a sample (sample solution) is absorptiometry. The absorptiometry is a method of applying light to a sample to measure the amount of transmitted light and quantifying the concentration from the attenuation amount (absorbance) of the light amount using the Lambert-Beer law.

The Lambert-Beer law is a law in which an absorbance of a solution is proportional to the concentration of the solution and the thickness of the solution (an optical path length of a cell containing the solution). A law in which the absorbance is proportional to the optical path length when the concentration is constant is called Lambert's law. A law in which the absorbance is proportional to the concentration of the solution when the optical path length is constant is called Beer's law. It is required that a wide concentration range (dynamic range) can be measured with a simpler configuration in measurement of the concentration of a component in a sample by the absorptiometry. Examples of a sample measurement device capable of widening a dynamic range by making a cell optical path length variable are known as, for example, PTLs 1 to 3.

In such measurement by the absorptiometry for measuring the amount of transmitted light, however, there is a problem that a variation in the amount of light from a light source is directly reflected in a variation in a measurement result of the concentration. The variation in the amount of light is caused by, for example, a change in the amount of emitted light from the light source due to a temperature change. For example, when an LED light source is used, the amount of emitted light tends to vary depending on the temperature. As described above, when a simple configuration, such as an LED and a camera, is used, the variation in the amount of light is large, so that there are problems that it is difficult to accurately measure the concentration at the time of measuring the sample and the dynamic range is narrowed.

CITATION LIST

Patent Literature

PTL 1: JP 2004-340804 A
PTL 2: JP 2006-194775 A
PTL 3: Japanese Patent No. 4220879

SUMMARY OF INVENTION

Technical Problem

The present invention has been made in view of the above problems. An object of the present invention is to provide a sample measurement device and a sample measurement method capable of accurately measuring an absorbance or a concentration of a sample and obtaining a high dynamic range even when the amount of light of a light source is not stable.

Solution to Problem

A sample measurement device according to the present invention includes: a sample container that stores a sample solution; a light source that irradiates the sample container with irradiation light from a first direction; an imaging part that captures an image of the sample solution based on light scattered by the sample solution from a second direction intersecting the first direction; and a calculator that calculates an absorbance or a concentration of the sample solution based on the image. The calculator calculates a degree of attenuation of a light amount of the image at a constant optical path length along the first direction based on the image, and calculates the absorbance or concentration of the sample solution according to the degree of attenuation.

A sample measurement method according to the present invention includes: storing a sample solution in a sample container; irradiating the sample container with irradiation light from a first direction; capturing an image of the sample solution based on light scattered by the sample solution from a second direction intersecting the first direction; and calculating a degree of attenuation of a light amount of the image at a constant optical path length along the first direction based on the image and calculating an absorbance or a concentration of the sample solution according to the degree of attenuation.

Advantageous Effects of Invention

According to the present invention, when the sample container is irradiated with the irradiation light emitted by the light source from the first direction of the sample container, the irradiation light is scattered in the sample solution. Based on the scattered light, the image of the sample solution is captured by the imaging part from the second direction intersecting the first direction. The calculator calculates the absorbance or concentration of the sample solution based on the image. At this time, the calculator calculates the degree of attenuation of the light amount of the image along the first direction, and calculates the concentration of the sample solution according to the degree of attenuation. In the present invention, the light irradiated from the first direction and scattered at a plurality of different points in the sample solution is captured as the image by the imaging part from the second direction, and the absorbance or concentration of the sample solution is calculated from the degree of attenuation. The degree of attenuation does not greatly vary in the constant optical path length even if the light amount of the irradiation light irradiated from the light source varies. In the sample solution in the sample container, the irradiation light is scattered at a plurality of positions in the first direction, and the plurality of positions have different optical path lengths. Thus, it is possible to perform measurement with different optical path lengths without adding a complicated configuration. Therefore, it is possible to provide the sample measurement device and the sample measurement method capable of accurately measuring the concentration and obtaining the high dynamic range even when the amount of light of the light source is not stable according to the present invention.

BRIEF DESCRIPTION OF DRAWINGS

FIG. 1 is a schematic diagram for describing a schematic configuration of a sample measurement device according to a first embodiment.

FIG. 3 is a schematic diagram for describing a schematic configuration of a sample measurement device according to a second embodiment.

DESCRIPTION OF EMBODIMENTS

Figure 2:
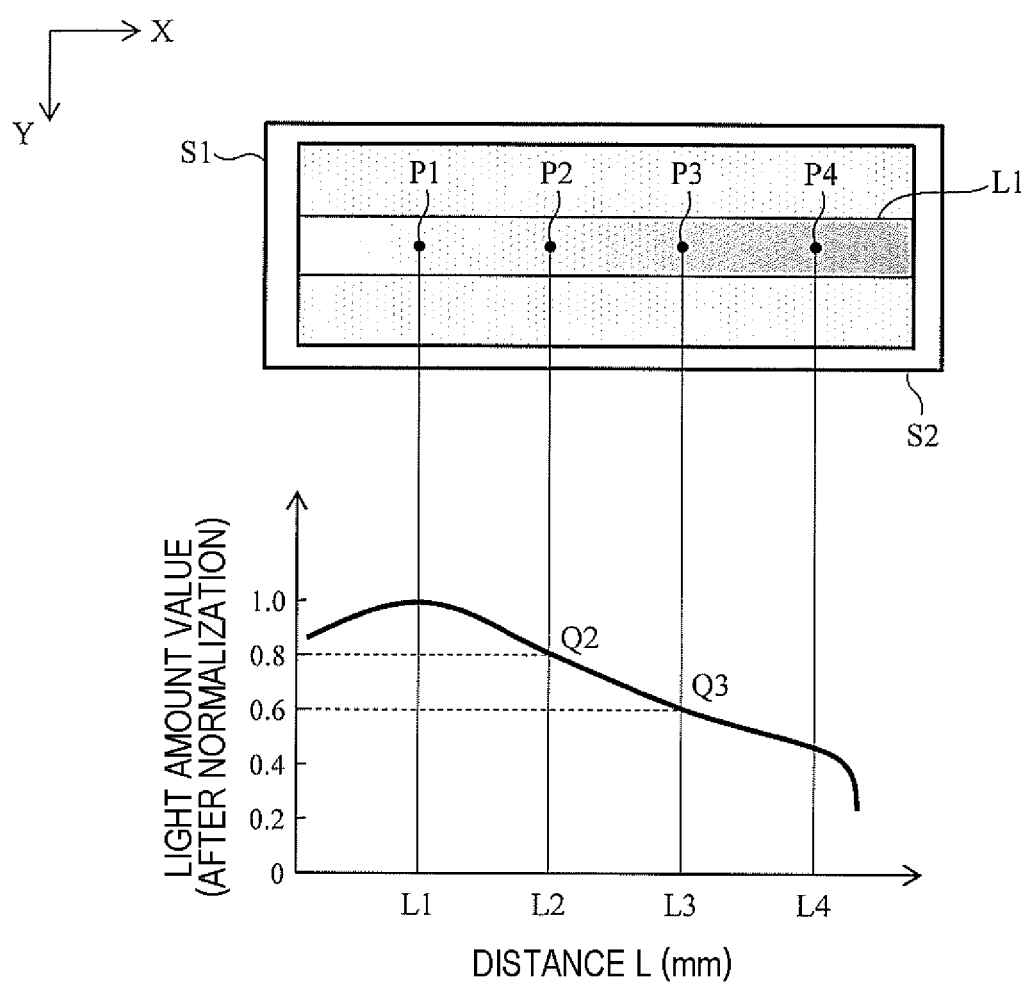
FIG. 2 is a schematic diagram for describing an operation of the sample measurement device according to the first embodiment.

Hereinafter, embodiments of the present invention will be described with reference to the attached drawings. In the accompanying drawings, functionally identical elements are sometimes denoted by the same number. Incidentally, the embodiments and implementation examples according to the principle of the present disclosure are illustrated in the accompanying drawings. These are given for the understanding of the present disclosure, and are not used to limit the present disclosure by no means. The description in the present specification is merely illustrative and is not intended to limit the scope of the claims or the application of the present disclosure by no means.

The present embodiments are described in sufficient detail for those skilled in the art to carry out the present disclosure. However, other types of implementation and forms can be applied, and it is necessary to understand that changes in configurations and the structures can be made and elements can be variously replaced without departing from the scope and the gist of the technical idea of the present disclosure. Therefore, the following description shall not be interpreted in a manner of being limited thereto.

First Embodiment

A sample measurement device according to a first embodiment will be described with reference to FIGS. 1 and 2. As an example, the sample measurement device 1 includes a sample container 11, a light source 12, a condenser lens 13, a camera 14 (imaging part), an A/D converter 15, a calculation and control unit 16 (calculator), and a display 18. The sample measurement device 1 is configured to be capable of measuring an absorbance or a concentration of a sample solution Sm in the sample container 11.

The sample container 11 is, for example, a container that has a rectangular shape. The sample container 11 is at least partially made of a transparent material. The sample container 11 is configured to be capable of storing the sample solution Sm (sample) to be measured therein. Here, the sample container 11 includes a first surface S1 that is at least partially transparent and a second surface S2 that intersects with the first surface S1 and is at least partially transparent. The shape of the sample container 11 is not limited to the rectangular shape, and containers having various shapes can be adopted as long as a measurement method to be described later can be executed. In FIG. 1, a direction substantially orthogonal to the first surface S1 is defined as an X direction (first direction). A direction substantially orthogonal to the second surface S2 is defined as a Y direction (second direction). The first surface S1 and the second surface S2 do not need to be substantially orthogonal to each other, and may have a positional relationship in which scattered light can be observed as will be described later.

The light source 12 is arranged on the first surface S1 with the condenser lens 13 interposed therebetween. The light source 12 is, for example, a light emitting diode (LED). For example, a monochromatic LED having an emission wavelength of 660 nm can be suitably used. Note that, the emission wavelength is not limited thereto, and the emission wavelength is not necessarily a single wavelength. It is also possible to adopt a light source that emits light of a plurality of wavelength bands. Irradiation light L1 emitted from the light source 12 is condensed by the condenser lens and applied to the sample solution Sm via the first surface S1. The sample solution Sm contains particles. Examples of the particles include, but are not limited to, latex particles. The irradiation light L1 incident on the sample solution Sm along the X direction from the first surface S1 is scattered by the particles, and a part thereof is scattered in the Y direction.

The camera 14 opposes the second surface S2. The camera 14 images the sample container 11 and the sample solution Sm from the Y direction substantially orthogonal to the second surface S2, thereby acquiring an image signal. The camera 14 is arranged independently of the sample container 11 in FIG. 1. Alternatively, the sample container 11 and the camera 14 may have an integrated structure. The image signal acquired by the camera 14 is converted into image data as a digital signal by the A/D converter 15 and then input to the calculation and control unit 16. The calculation and control unit 16 calculates the degree of attenuation (absorbance) of the light amount between at least two points (known optical path lengths) in the image using the digital image data. The calculation and control unit 16 calculates a concentration (particle concentration) of the particles in the sample solution Sm according to the calculation result. The calculated concentration is displayed on the display 18.

The calculation and control unit 16 can be configured using, for example, a general-purpose computer. The calculation and control unit 16 generates data of the concentration of the sample solution Sm or the like by performing certain arithmetic processing on the image data as digital data input from the camera 14. When the general-purpose computer is used, necessary arithmetic processing can be performed by executing a program by a built-in processor (for example, a CPU or a GPU) and performing processing defined by the program while using a storage resource (for example, a memory), an interface device (for example, a communication port), and the like. The processor may include a dedicated circuit that performs specific processing. Here, examples of the dedicated circuit include a field programmable gate array (FPGA), an application specific integrated circuit (ASIC), a complex programmable logic device (CPLD), and the like.

The program may be installed from a program source onto a computer. The program source may be, for example, a program distribution server or a computer-readable storage medium. When the program source is the program distribution server, the program distribution server may include a processor and a storage resource storing a distribution target program. The processor of the program distribution server may distribute the distribution target program to another computer. Further, in examples, two or more programs may be realized as one program, or one program may be realized as two or more programs.

Next, a method for calculating the concentration of the sample solution Sm in the first embodiment will be described with reference to FIG. 2.

When the sample container is irradiated with the irradiation light L1 from the first surface S1, the irradiation light L1 is scattered by the particles in the sample solution Sm to gradually attenuate as proceeding from the left direction to the right direction in FIG. 2. The sample solution Sm irradiated with the irradiation light L1 in this manner is imaged by the camera 14 from the Y direction, whereby image data thereof is acquired. The image data is stored in a storage (not illustrated) in the calculation and control unit 16.

The graph illustrated at lower position of FIG. 2 illustrates an example of a relationship between a distance L from the first surface S1 at a position of the sample solution Sm irradiated with the irradiation light L1 in the image data and a light amount value (after normalization) at the position.

Due to the relationship with scattered light, the light amount value is maximized in the vicinity of a position P1 slightly away from the first surface S1 (distance L from the first surface S1=L1), and thereafter, decreases as the distance from the first surface S1 increases. For example, in a case where there are measurement points P1, P2, P3, and P4 in descending order of distance from the first surface S1 and a light amount of an image at each of the measurement points P1 to P4 is measured, the light amount of the image decreases as the distance from the first surface S1 increases due to scattering or the like of the particles.

The degree of attenuation (slope) in this graph increases as the concentration of the sample solution Sm increases. Then, the calculation and control unit 16 specifies arbitrary two points with the known optical path lengths, for example, the measurement point P2 (first measurement point: distance L=L2) and the measurement point P3 (second measurement point: distance L=L3*L2). The calculation and control unit 16 measures light amount values Q2 and Q3 at these specified two measurement points P2 and P3. Then, the degree of attenuation of the light amount value between the two points (hereinafter, referred to as an attenuation amount Da) is calculated, that is, $Da=(Q3-Q2)/(L3-L2)$ is calculated. Although not illustrated, the calculation and control unit 16 includes a lookup table indicating a relationship between the attenuation amount Da and the concentration of the sample solution Sm. The calculation and control unit 16 refers to the lookup table to identify the concentration of the sample solution Sm. Incidentally, positions of the measurement points P2 and P3 to be measured can be appropriately changed. When the positions of the measurement points P2 and P3 are changed, the lookup table is also changed according to the positions.

It is also possible to execute measurement according to measurement values at a plurality of other measurement points, instead of using the measurement values at the measurement points P2 and P3. For example, in a case where the concentration of the sample solution Sm to be measured is extremely high, the light amount value Q3 at the measurement point P3 far from the first surface S1 is an extremely small value, and thus, is hardly measured. In this case, instead of the measurement at the measurement points P2 and P3, the measurement at the measurement points P1 and P2, which are points closer to the first surface S1, can be performed, and the concentration can be calculated according to the measurement result.

According to the structure and the measurement method of the first embodiment, even if the light amount of the irradiation light L1 from the light source 12 varies due to a certain factor (a temperature variation, a variation in power source, or the like), the concentration of the sample solution Sm can be accurately measured, and the measurement can be performed in a high dynamic range. In the first embodiment, the concentration of the sample solution Sm is measured according to the attenuation amount Da of the light amount of the image between at least two points in the sample solution Sm.

When the light amount of the irradiation light L1 varies, the light amount of the image at each measurement point varies accordingly. However, a ratio of a variation in light amount at each measurement point relative to a change in certain light amount of the irradiation light L1 is substantially the same among a plurality of measurement points. Therefore, the attenuation amount Da does not greatly vary regardless of the variation in the light amount of the irradiation light L1. Therefore, the concentration of the sample solution Sm can be accurately measured even if the light amount of the irradiation light L1 varies according to the first embodiment. Further, the positions of the measurement points P1 to P4 can be easily changed in the calculation and control unit 16 without requiring a complicated additional structure. Thus, measurement with an appropriately changed optical path length is also possible. Therefore, the measurement can be performed in a high dynamic range.

Meanwhile, the case where the concentration of particles is measured by using scattering of light in the particles in the sample solution Sm (sample) has been mainly described in the first embodiment described above. Instead of measuring the concentration of the particles in the sample solution Sm, it is also possible to measure the concentration of a light-absorbing substance in the sample solution Sm while keeping the concentration of the particles in the sample solution Sm constant. In this case, a component based on scattered light is constant, while a light amount value increases as the light-absorbing substance increases in a light amount value in image data measured by the camera 14 and the calculation and control unit 16.

Second Embodiment

Next, a sample measurement device according to a second embodiment will be described with reference to FIGS. 3 to 6. FIG. 3 is a schematic diagram for describing an overall structure of the sample measurement device according to the second embodiment. In FIG. 3, the same components as those of the first embodiment (FIG. 1) are denoted by the same reference signs in FIG. 3, and redundant descriptions thereof will be omitted hereinafter. The second embodiment is different from the first embodiment in that a calibration data storage 19 that stores calibration data is provided, and a concentration of a sample solution Da to be measured can be measured according to the calibration data.

The calibration data storage 19 is a storage that stores calibration data acquired by measuring a calibration solution having a known concentration. The calibration data is obtained by measuring a plurality of types of calibration solutions having known concentrations in advance, and indicates a relationship between the attenuation amount Da and an absorbance Ab. When the attenuation amount Da of the sample solution Sm to be measured is obtained by the same method as that in the first embodiment, the absorbance or concentration of the sample solution Sm can be accurately measured by referring to the calibration data. Since the measurement is performed by referring to the calibration data obtained according to the measurement results of the calibration solutions having known concentrations, a more reliable measurement result can be obtained.

Figure 4:
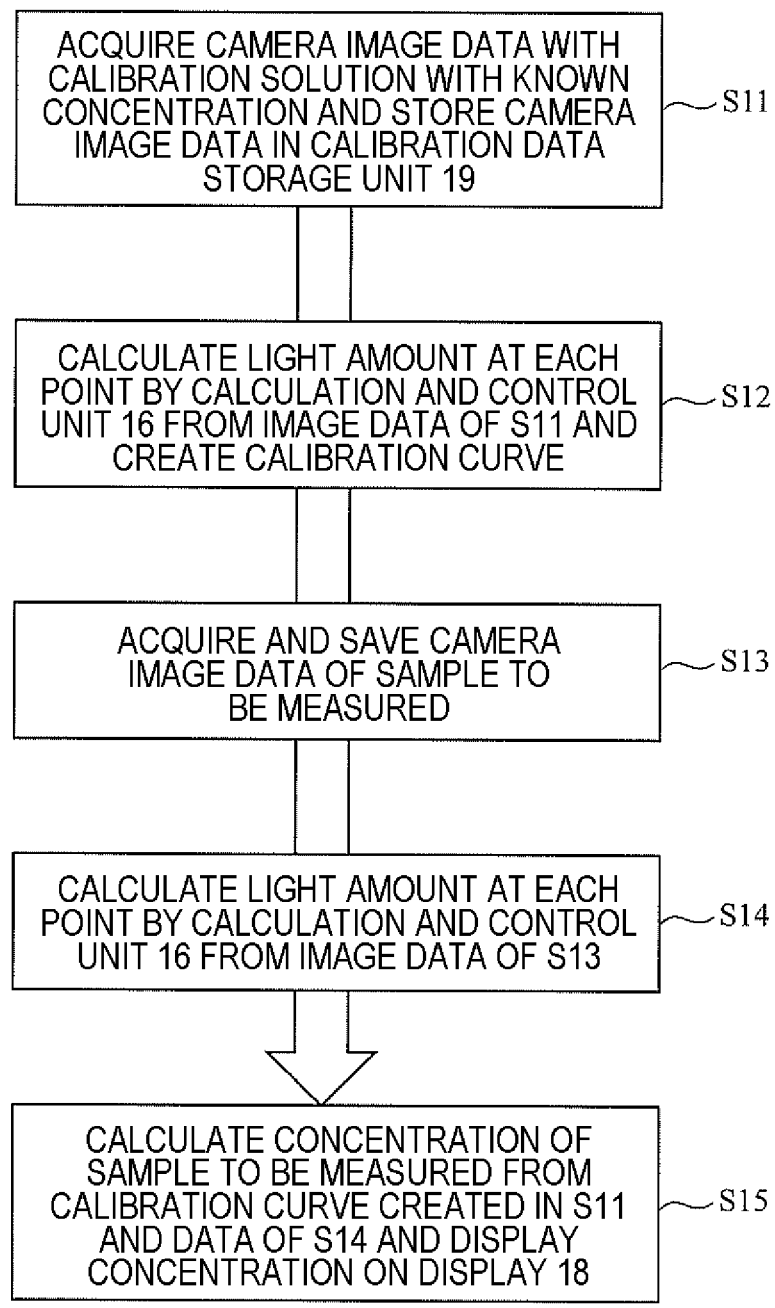
FIG. 4 is a flowchart for describing an operation of the sample measurement device according to the second embodiment.

Next, an execution procedure of a concentration measurement method in the second embodiment will be described with reference to FIGS. 4 to 6. FIG. 4 is a flowchart illustrating the execution procedure of the measurement method. Graphs of FIGS. 5 and 6 illustrate a method for generating calibration data in the second embodiment.

In this method, prior to measurement of the sample solution Sm to be measured, calibration solutions Sc (here, five types of calibration solutions Sc1 to Sc5) are sequentially injected into the sample solution 11. Then, a light amount value is measured by the same method (FIG. 2) as the measurement of the sample solution Sm in the first embodiment. That is, the sample container 11 into which the calibration solutions Sc1 to Sc5 have been injected is irradiated with the irradiation light L1 from the X direction. Then, an image based on scattered light is captured by the camera 14 from the Y direction, and image data obtained as a result is stored in the calibration data storage 19 (step S11).

Next, the calculation and control unit 16 analyzes the image data of the calibration solutions Sc1 to Sc5 obtained in step S11, calculates a light amount value (after normalization) at each measurement point, and creates a calibration curve (step S12).

Figure 5:
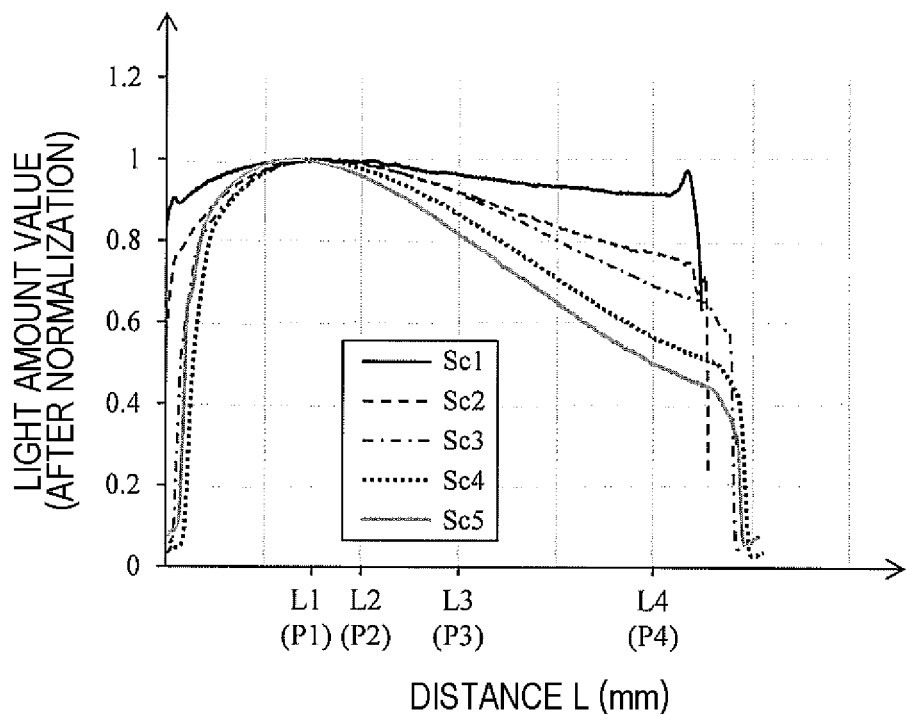
FIG. 5 is a graph illustrating a relationship between a distance L and a light amount value (after normalization) obtained by imaging calibration solutions Sc1 to Sc5 with a camera 14.
Figure 6:
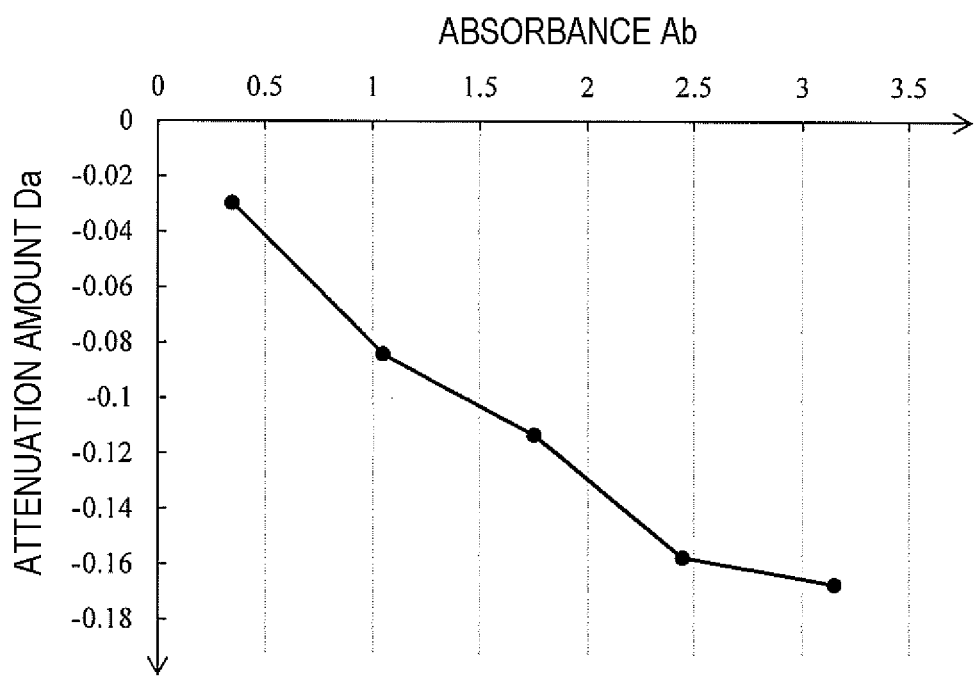
FIG. 6 illustrates an example of a calibration curve obtained based on measurement results of the calibration solutions Sc1 to Sc5.

FIG. 5 is a graph illustrating an example of a relationship between the distance L of each measurement point from the first surface S1 and the light amount value (after normalization) at each measurement point in the image data of the calibration solutions Sc1 to Sc5. The calibration solutions Sc1 to Sc5 have different concentrations and absorbances Ab. The degree of decrease in the light amount value between the same distances increases as the concentration and the absorbance Ab increase. In the example of FIG. 5, the calibration solution Sc1 has the lowest concentration, and the concentration increases in the order of the calibration solutions Sc2, Sc3, Sc4, and Sc5. Therefore, an inclination (attenuation amount) of the obtained graph also increases in this order. As an example, the calculation and control unit 16 measures the attenuation amount Da as the degree of decrease in the light amount value (after normalization) between the measurement point P2 (distance L2) and the measurement point P3 (distance L3), and generates a calibration curve based on the measurement result.

FIG. 6 illustrates an example of the calibration curve for the sample measurement device 1 obtained from the graph of FIG. 5. This calibration curve can be formed by acquiring the relationship between the absorbance Ab of the calibration solution Sc stored in the sample container 11 and the above-described attenuation amount Da and connecting obtained plots. The calibration curve in FIG. 6 is formed by simply connecting a plurality of plots with a straight line, but is not limited thereto. A calibration curve may be obtained by approximate calculation using a least squares method or the like. The obtained calibration curve is stored in the calibration data storage 19 as calibration data.

When the calibration curve is obtained and stored in the calibration data storage 19 as the calibration data, the sample solution Sm (sample) to be measured is subsequently injected into the sample container 11, and measurement similar to that in the first embodiment is executed. That is, the first surface S1 of the sample container 11 into which the sample solution Sm has been injected is irradiated with the irradiation light L1 along the X direction. In this state, the sample solution Sm is imaged by the camera 14 from the Y direction (step S13). Image data obtained by the camera 14 is stored in the storage (not illustrated) in the calculation and control unit 16. The calculation and control unit 16 calculates a light amount value (after normalization) at each point in the image data acquired in Step S13 and stored in the storage (Step S14).

Then, data of the light amount value calculated in step S14 is compared with the calibration curve generated in step S12, and the concentration of the sample solution Sm (sample) to be measured is calculated based on the comparison result (step S15). Specifically, the attenuation amount Da at each of points P2 and P3 in the image data of the sample solution Sm is measured, and the absorbance Ab corresponding to the attenuation amount Da is identified according to the calibration curve (FIG. 6). As the absorbance Ab is identified, a corresponding concentration value is calculated by the calculation and control unit 16. The calculated concentration value is displayed on the display 18.

As described above, according to the second embodiment, the calibration data acquired by measuring the calibration solution having the known concentration is stored in the calibration data storage 19, and the concentration of the sample solution Sm to be measured can be accurately measured according to the calibration data.

The present invention is not limited to the above-described embodiments, and includes various modifications. For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment. Further, a configuration of another embodiment can be added to a configuration of a certain embodiment. Moreover, addition, deletion or substitution of other configurations can be made with respect to some configurations of each embodiment.

REFERENCE SIGNS LIST 1 sample measurement device
11 sample container
12 light source
13 condenser lens
14 camera
15 A/D converter
16 calculation and control unit
18 display
19 calibration data storage
S1 first surface
S2 second surface
Sc(Sc1 to 5) calibration solution
Sm sample solution

The invention claimed is:
1. A sample measurement device comprising:
a sample container that stores a sample solution;
a light source that irradiates the sample container with irradiation light from a first direction;
a camera that captures an image of the sample solution based on light scattered by the sample solution from a second direction intersecting the first direction; and
a processor that calculates an absorbance or a concentration of the sample solution based on the image,
wherein the processor calculates a degree of attenuation of a light amount of the image at a constant optical path length along the first direction based on the image, and calculates the absorbance or the concentration of the sample solution according to the degree of attenuation, and wherein the processor calculates a degree of attenuation of a light amount of the image obtained for the sample solution to be measured, and calculates the absorbance or the concentration of the sample solution corresponding to the degree of attenuation based on calibration data.

2. The sample measurement device according to claim 1, wherein
the sample solution contains a particle, and
the irradiation light is applied toward the sample container from the first direction and is scattered by the particle.

3. The sample measurement device according to claim 1, wherein the processor measures light amounts of the image at a first measurement point having a first optical path length and a second measurement point having a second optical path length different from the first optical path length, and calculates a degree of attenuation of a light amount of the image between the first measurement point and the second measurement point based on the measured light amounts.

4. The sample measurement device according to claim 1, further comprising
a calibration data storage that stores the calibration data.

5. The sample measurement device according to claim 4, wherein the camera and the processor are configured to calculate the calibration data and store the calibration data in the calibration data storage by injecting a plurality of calibration solutions having known concentrations sequentially into the sample container, irradiating the calibration solutions with the irradiation light, capturing images using the camera, calculating concentrations of the calibration solutions using the processor.

6. The sample measurement device according to claim 4, wherein the calibration data is a calibration curve indicating a relationship between an absorbance and a degree of attenuation of a light amount at a constant optical path length, and
wherein the processor calculates the absorbance or the concentration of the sample solution by comparing the degree of attenuation of the light amount obtained for the sample solution with the calibration curve.

7. A sample measurement method comprising:
storing a sample solution in a sample container;
irradiating the sample container with irradiation light from a first direction;
capturing an image of the sample solution based on light scattered by the sample solution from a second direction intersecting the first direction; and
calculating a degree of attenuation of a light amount of the image at a constant optical path length along the first direction based on the image and calculating an absorbance or a concentration of the sample solution according to the degree of attenuation,
wherein the degree of attenuation of the light amount of the image obtained for the sample solution to be measured is calculated, and the absorbance or the concentration of the sample solution corresponding to the degree of attenuation is calculated based on calibration data.

8. The sample measurement method according to claim 7, wherein
the sample solution contains a particle, and
the irradiation light is applied toward the sample container from the first direction and scattered by the particle.

9. The sample measurement method according to claim 7, further comprising:
measuring light amounts of the image at a first measurement point having a first optical path length and a second measurement point having a second optical path length different from the first optical path length,
wherein the degree of attenuation of the light amount of the image between the first measurement point and the second measurement point is calculated based on the measured light amounts.

10. The sample measurement method according to claim 7, further comprising:
storing the calibration data in a calibration data storage.

11. The sample measurement method according to claim 10, further comprising:
injecting a plurality of calibration solutions having known concentrations sequentially into the sample container; and
irradiating and imaging the calibration solutions with the irradiation light, calculating concentrations of the calibration solutions to calculate the calibration data, and storing the calibration data in the calibration data storage.

12. The sample measurement method according to claim 10, wherein the calibration data is a calibration curve indicating a relationship between an absorbance and a degree of attenuation of a light amount at a constant optical path length, and
wherein the absorbance or the concentration of the sample solution is calculated by comparing the degree of attenuation of the light amount obtained for the sample solution with the calibration curve.

* * * * *